W. S. SIMPSON.

APPARATUS FOR MELTING AND MIXING METALS IN VACUO.

APPLICATION FILED SEPT. 16, 1913.

Reissued Dec. 15, 1914.

13,849.

2 SHEETS—SHEET 1.

W. S. SIMPSON.

APPARATUS FOR MELTING AND MIXING METALS IN VACUO.

APPLICATION FILED SEPT. 16, 1913.

Reissued Dec. 15, 1914.

13,849.

2 SHEETS—SHEET 2.

Witnesses
C. Kesler
H. C. Ashley

Inventor
William S. Simpson
by
James L. Norris
Attorney.

UNITED STATES PATENT OFFICE.

WILLIAM SPEIRS SIMPSON, OF LONDON, ENGLAND.

APPARATUS FOR MELTING AND MIXING METALS IN VACUO.

13,849. Specification of Reissued Letters Patent. Reissued Dec. 15, 1914.

Original No. 1,015,091, dated January 16, 1912, Serial No. 625,288. Application for reissue filed September 16, 1913. Serial No. 790,106.

*To all whom it may concern:*

Be it known that I, WILLIAM SPEIRS SIMPSON, a subject of the King of Great Britain, residing at London, England, have invented new and useful Improvements in Apparatus for Melting and Mixing Metals *in Vacuo*, of which the following is a specification.

This invention relates to apparatus for melting and mixing metals *in vacuo*, and its object is to provide an improved apparatus for generally effecting the operations indicated; for removing volatilizable impurities from certain metals which are easily oxidizable if fused in contact with atmospheric air, such as aluminium, magnesium, calcium and the like, with which it is desirable to form useful alloys; for preventing the hitherto unavoidable oxidation and deterioration of such metals while in a molten state; for introducing purifying substances or any metals required for alloying purposes into the molten metal or metals in the crucible; and for effectively stirring the aforesaid molten metal or metals in the crucible and mixing and alloying the same with the substances or metals introduced; the result affording a purified metal or alloy of uniformly superior quality and strength.

In carrying out my invention I construct a receptacle or chamber preferably metallic, of suitable size, shape and dimensions wherein a comparatively high vacuum may be created and maintained by means of a vacuum pump in any convenient manner. Inside such chamber is placed a crucible made of refractory or carbonaceous material for containing the metals to be treated, which metals are heated by means of an electric current applied to the top and bottom of the crucible.

Figure 1:
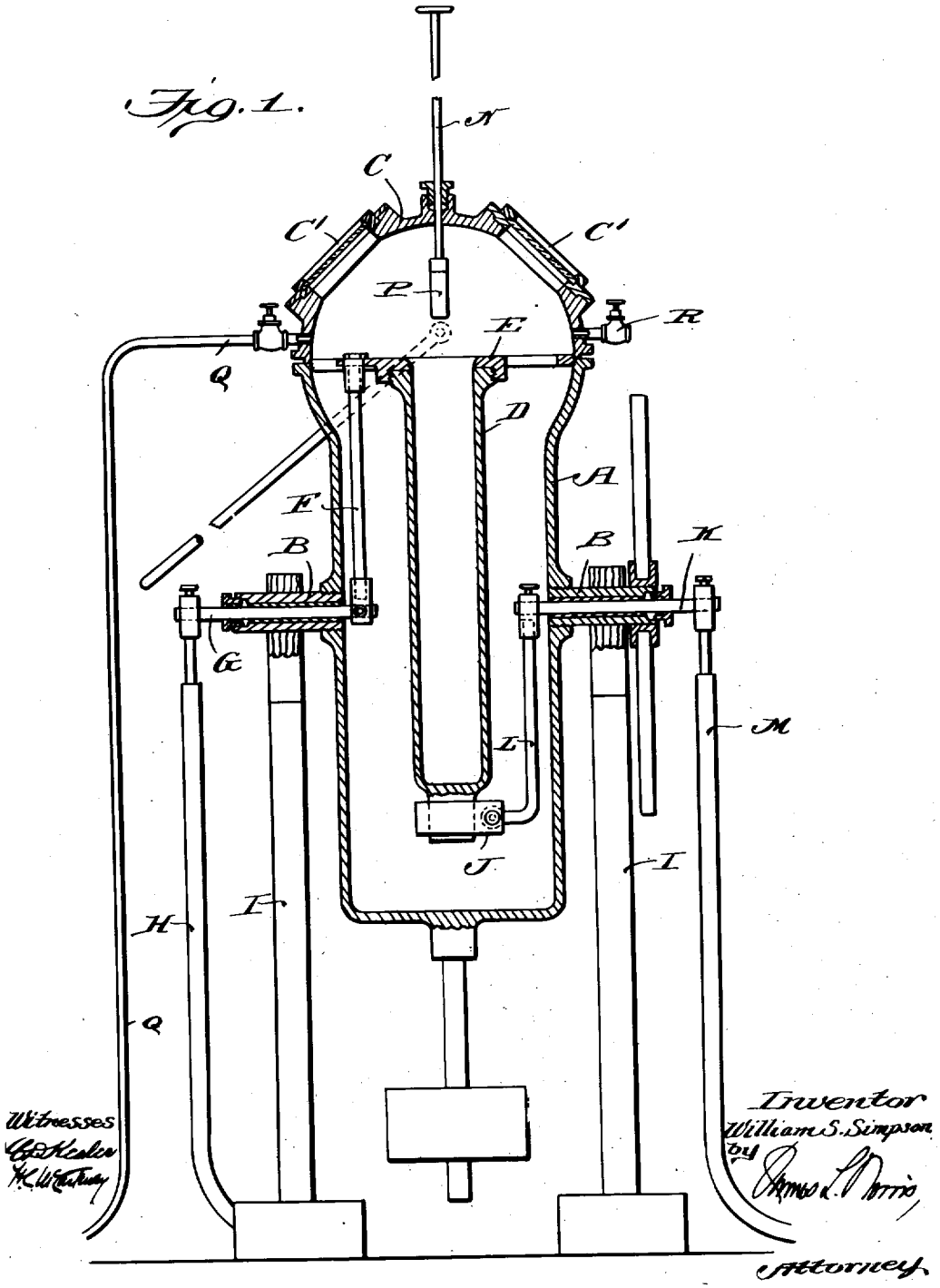
Figure 2:
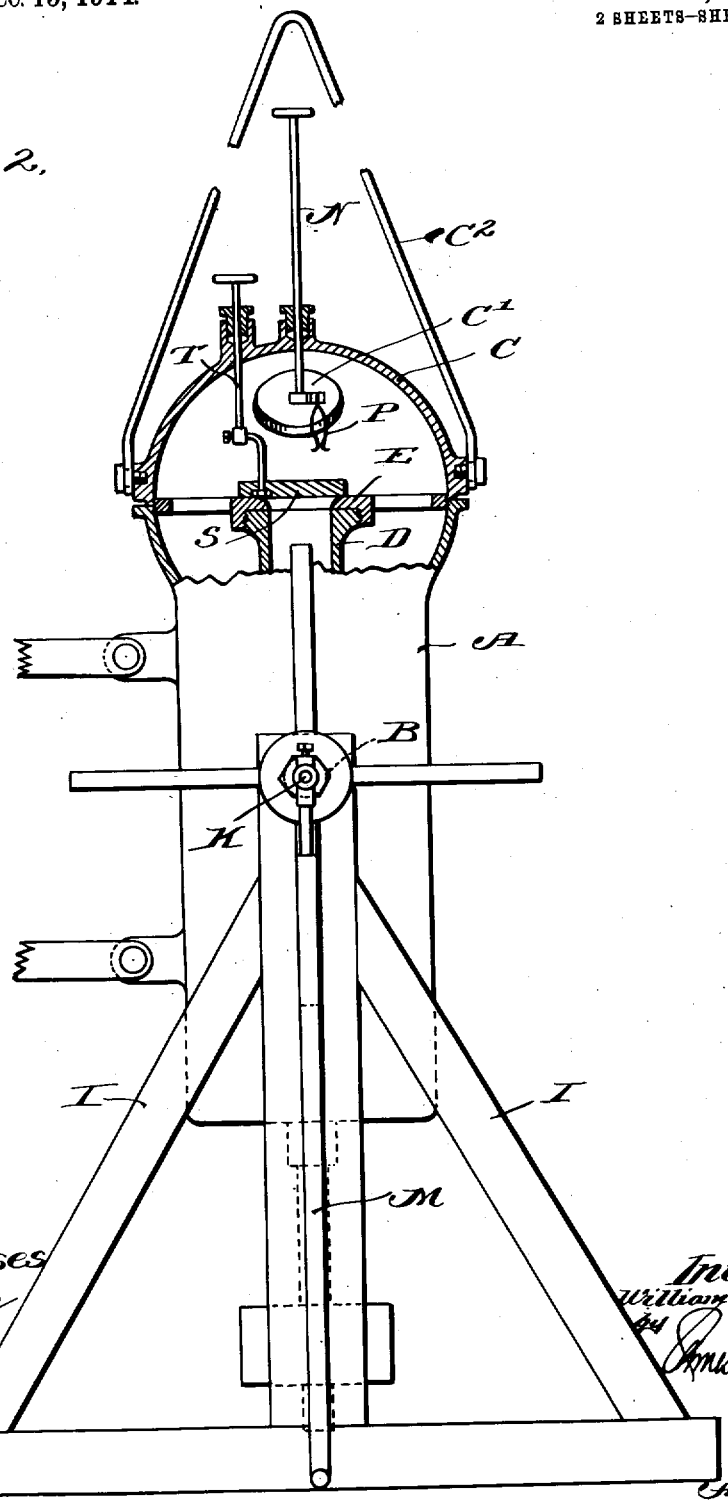

The most effective and economical form of apparatus suitable for my purposes is shown in the drawings hereto attached, Figure 1 being a sectional elevation and Fig. 2 a part-sectional elevation of the apparatus.

The exterior of the vacuum chamber or furnace A is made of metal and mounted on trunnions B to allow of its being tilted sufficiently to pour out the contents. A removable top or cover C is provided together with suitable means for hermetically sealing the vacuum chamber or furnace A therewith. Within this chamber A there is placed a receptacle D in the form of a crucible or cylindrical vessel made of refractory material, preferably carbonaceous, such as will afford adequate resistance to electric currents. The space between the exterior walls thereof and the metallic vacuum chamber is filled with a heat resisting and non-conducting material, such as magnesite. To the open top of this crucible D there is suitably attached a metallic ring E which is provided with means of internal cooling by a circulation of water, which ring E forms one of the battery terminals for the application of electric energy to the crucible and its contents, by means of rods F, G, connecting the ring E and the lead wire H through one hollow trunnion B of the stand I. In a similar manner another metallic ring or plate J also internally water cooled is placed under the bottom of such crucible and furnishes the other electric terminal through the rods K, L, connecting such plates J with the other lead wire M. Electric energy is applied through the terminals E and J above described while a vacuum is being maintained within the inclosing vacuum chamber; under which conditions a zone of intense heat is produced midway between the metallic terminals E, J and throughout the circumference of the crucible D and the metallic substances contained therein. The generation of electrical heat is thus effected with great economy of power and the whole operation being carried on *in vacuo* the damage to plant or loss by oxidation of the contents of the crucible or of the crucible itself or the internal component parts of the apparatus is to a great extent obviated.

Means are provided for the mechanical stirring or mixing of the molten metal or metals in the crucible and also for the introduction therein of purifying substances or any metals required for alloying purposes, by a rod or shaft N introduced through the cover C of the vacuum chamber and suitably fitted to move up and down or in a rotary manner to stir the molten metals in the crucible without breaking the vacuum. To this rod N a clip P is attached for holding any substance required to be submerged in the molten contents of the crucible during the operation.

Q is the pipe connecting the vacuum chamber with the suction pump and R is a pipe for admitting air to break vacuum when required.

S is a cover to the receptacle D capable of being moved to cover or uncover the receptacle by manipulation of the rod T which is connected to it and passes through the cover C, suitable means, such as a stuffing box, being provided to maintain the vacuum. The removable cover C is preferably provided with suitable observation windows C′ and also with a lifting yoke or handle $C^2$ whereby the cover may be removed with facility during charging and emptying of the apparatus.

During operation of the apparatus, the vacuum space is tightly closed to effectually prevent entrance of air from the atmosphere, thereby enabling a high degree of vacuum to be produced and maintained. The present invention, by providing means for introducing the metal or alloying substance into the molten metal from a position within the vacuum space and under the influence of the heating means, enables such metal or substance to be introduced into the molten metal in the crucible without admitting air from the exterior and so maintaining the high degree of vacuum, and, furthermore, such metal or substance is rendered free of oxygen or other gases and is heated more or less and hence can be introduced under the most favorable conditions into the molten metal.

What I do declare as my invention and desire to secure by Letters Patent is:—

1. Apparatus for melting, mixing and treating metals embodying a hollow crucible composed of refractory material possessing the property of conducting and offering resistance to the passage of an electric current to thereby convert directed electrical energy into heat energy, the crucible having an open chamber to receive and contain the metals to be treated, means for connecting electrical conductors to the top and bottom of such crucible, and a vacuum chamber inclosing the crucible.

2. In apparatus of the character described, the combination of a vacuum chamber, a crucible inclosed therein having an interior chamber to contain a charge of material to be treated and embodying means for heating it, and an adjustable device operable from the exterior of said chamber and extending into the chamber, said device being provided with means for introducing purifying substances or metals for alloying purposes into said chamber within the crucible and also operative as a stirrer or mixer.

3. In apparatus of the character described, the combination of a vacuum chamber comprising a body portion and a cover removably related thereto and adapted to form a fluid-tight connection with the body portion, a crucible contained within the body portion and having a chamber to contain a charge of the material to be treated and having an opening leading thereto, and a device carried by and extending movably through the cover and bearing a clip on its inner end, said device being movable in alinement with and into said opening and chamber in the crucible while the cover is applied to the body portion.

4. In apparatus of the character described, the combination of a vacuum chamber comprising a body portion having trunnions for mounting it tiltably, and a cover removably applied to the upper end thereof and adapted to form a fluid-tight connection therewith, a crucible contained within and carried by the body portion and having an interior chamber to contain a charge of the material to be treated and having its mouth arranged toward the top of the body portion, and means for conducting a heating medium to the crucible through said trunnions of the tiltably mounted body portion.

5. In apparatus for melting, mixing and otherwise treating metals, the combination, with a crucible, means for maintaining a high degree of vacuum upon the contents thereof, and means for heating said crucible to reduce its contents; of means for introducing metals or alloying substances into said contents while maintaining said high degree of vacuum.

6. In apparatus for melting, mixing and otherwise treating metals, the combination, with a crucible, means for maintaining a vacuum upon the contents thereof, and means for heating said crucible to reduce its contents; of means operable from the exterior of the crucible for introducing metals or alloying substances, from a position under the influences of said vacuum and heating means, into said contents during the maintenance of the vacuum.

7. In apparatus for melting, mixing and otherwise treating metals, the combination, with a crucible, means for maintaining a vacuum upon the contents thereof, and means for heating said crucible to reduce its contents; of an adjustable device operable from the exterior of the crucible and arranged to be projected into the contents of the latter, to introduce metals or alloying substances into said contents during the maintenance of the vacuum.

8. In apparatus for melting, mixing and otherwise treating metals, the combination, with a crucible, means for maintaining a vacuum upon the contents thereof, and means for heating said crucible to reduce its contents; of an adjustable device operable from the exterior of the crucible and having a portion arranged to be projected into the contents of the latter during the maintenance of the vacuum, said portion being adapted to carry metals or alloying substances to be introduced into said contents.

9. In apparatus for melting, mixing and otherwise treating metals, the combination, with a crucible, means for maintaining a vacuum upon the contents thereof, and means for heating said crucible to reduce its contents; of an endwise movable and rotatable device operable from the exterior of the crucible and arranged to be projected into the contents of the latter during the maintenance of the vacuum to stir said contents and introduce metals or alloying substances thereinto.

10. In apparatus for melting, mixing and otherwise treating metals, the combination, with a crucible, means for maintaining a high degree of vacuum upon the contents thereof, and means for heating said crucible to reduce its contents; of means operable during the maintenance of the vacuum for introducing metals or alloying substances, from a position under the influences of said vacuum and heating means, into said contents and for stirring the same.

In witness whereof, I have hereunto set my hand in the presence of two subscribing witnesses.

WILLIAM SPEIRS SIMPSON.

Witnesses:
HOWARD OVIATT,
H. D. JAMESON.